No. 689,647. Patented Dec. 24, 1901.
L. DE INTINIS.
CAR BRAKE.
(Application filed July 20, 1901.)
(No Model.) 2 Sheets—Sheet 1.
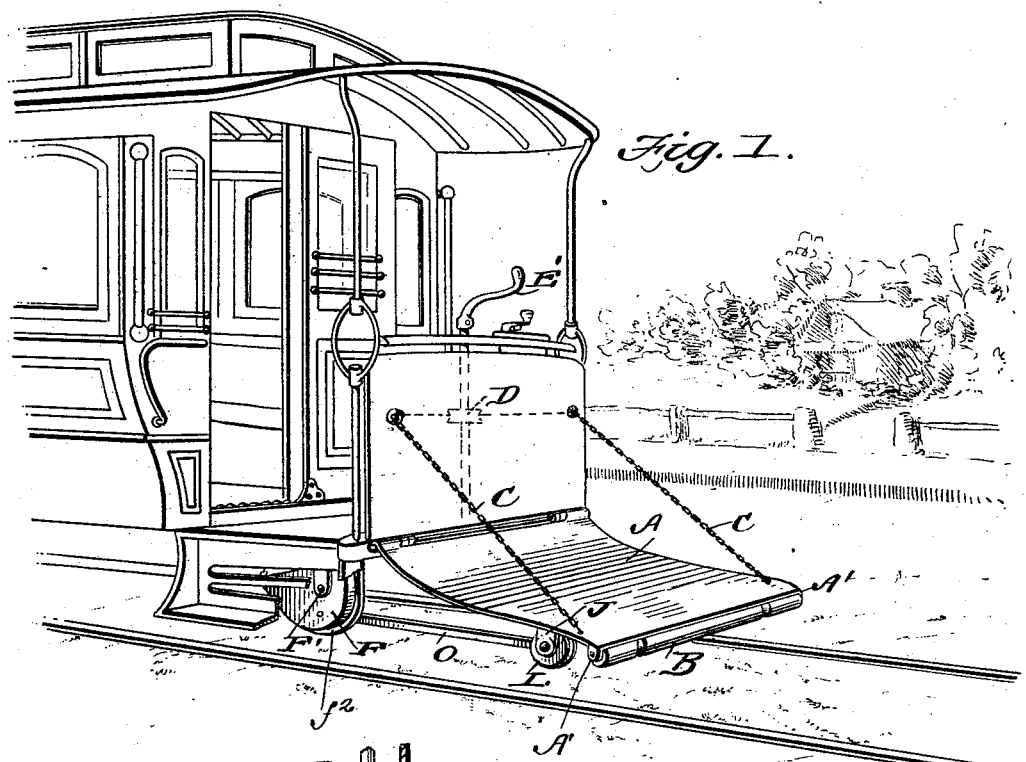
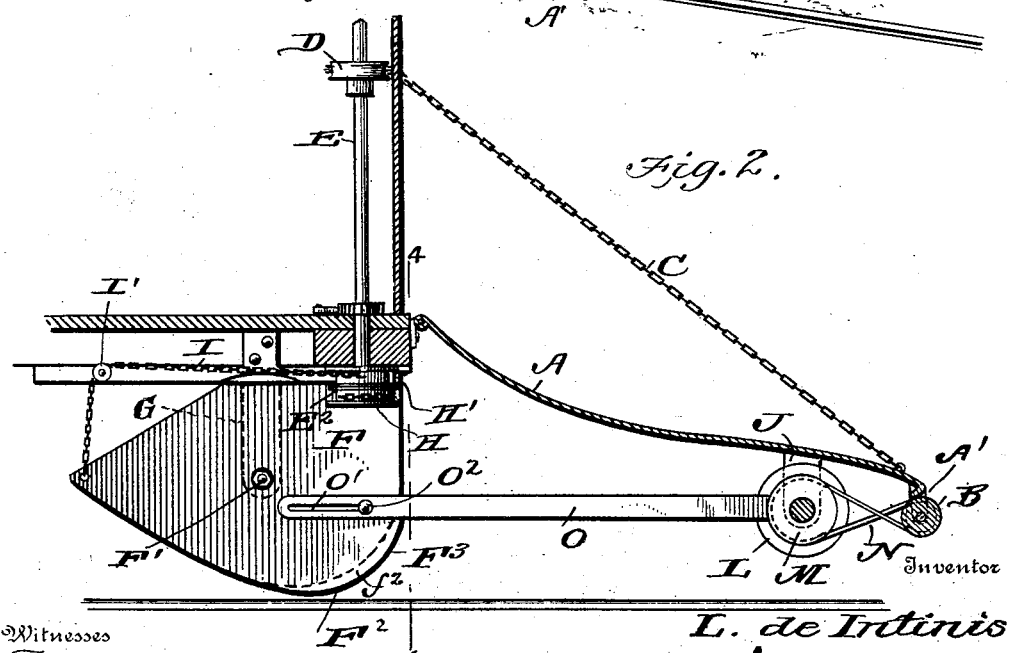

No. 689,647. Patented Dec. 24, 1901.
L. DE INTINIS.
CAR BRAKE.
(Application filed July 20, 1901.)
(No Model.) 2 Sheets—Sheet 2.
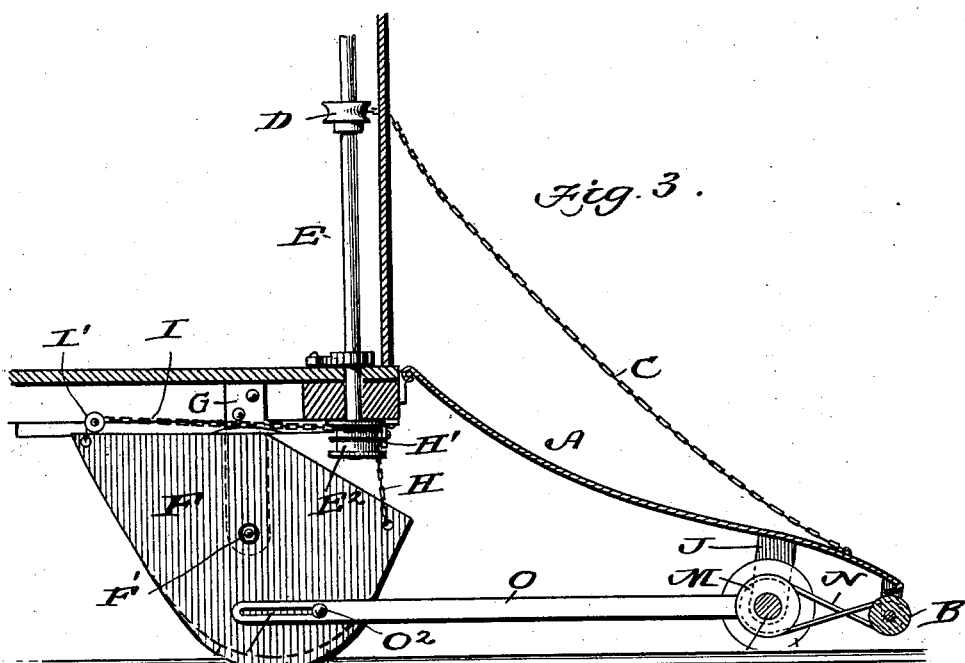
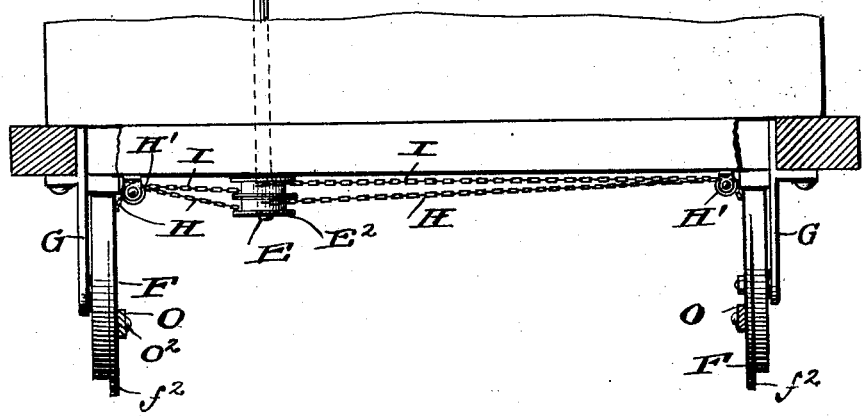
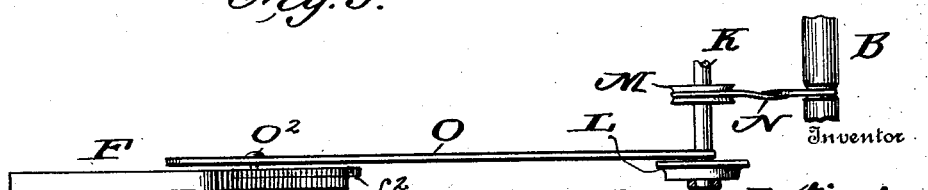
Witnesses
Inventor
L. de Intinis.
By
Attorneys

UNITED STATES PATENT OFFICE.

LINDORO DE INTINIS, OF ST. LOUIS, MISSOURI.

CAR-BRAKE.

SPECIFICATION forming part of Letters Patent No. 689,647, dated December 24, 1901.

Application filed July 20, 1901. Serial No. 69,126. (No model.)

*To all whom it may concern:*

Be it known that I, LINDORO DE INTINIS, a citizen of the United States, residing at St. Louis, in the State of Missouri, have invented a new and useful Car-Brake, of which the following is a specification.

This invention is a combined car brake and fender, the object being to provide an exceedingly cheap and simple device which can be applied to any and all street-cars now in use for the purpose of preventing accidents.

With these objects in view the invention consists, essentially, of a fender hinged to the front dashboard of a car and also in brake-blocks pivoted beneath the front platform, said brake-blocks being adapted to contact with the tracks for the purpose of checking the progress of the car, said brake-blocks being brought into contact with the rails simultaneously with the dropping of the fender.

The invention consists also in certain details of construction and novelties of combination, all of which will be fully described hereinafter and pointed out in the claims.

In the drawings forming a part of this specification, Figure 1 is a view showing the practical application of my invention, the fender and brake-blocks being raised. Fig. 2 is a vertical longitudinal section showing the position of the parts when the brake-blocks and fender are raised. Fig. 3 is a similar view showing the position of the parts when the brake-blocks and fender are lowered. Fig. 4 is a transverse sectional view on the line 4 4 of Fig. 2, and Fig. 5 is a detail sectional plan view.

In carrying out my invention I employ a fender A, which is preferably made of sheet metal and hinged to the forward wheel of the street-car. The forward end of this fender is provided with depending ears or lugs A', between which is journaled a roller B, preferably covered with rubber or similar material. Chains C are attached to the fender adjacent to its forward end, said chains being passed up and around pulleys secured to the dashboard of the car and are then continued inwardly and are attached to a spool D, mounted upon a vertical shaft E, provided with a crank-handle E' at one end and pulleys $E^2$ upon the lower end, the said pulleys $E^2$ being designed to receive chains, as will be explained later on.

The fender is normally held elevated, as shown in Figs. 1 and 2, the chains being wound around the spool for the purpose of holding the fender so elevated.

Brake-blocks F are pivoted in the depending brackets G, secured beneath the front platform of a car. The brake-blocks F are pivoted at F', and their lower edges $F^2$ are adapted to be brought into contact with the track-rails for the purpose of checking the progress of the car, the said lower edge $F^2$ having a flange $f^2$ to fit the rails, and in order to prevent binding the forward lower edges of the blocks are curved, as shown at $F^3$. The chain H is secured to the forward upper end of the brake-block and passes over a pulley H' and is connected at its opposite end to the lower end of a shaft E. Another chain I is attached to the rear end of the brake-block and passes over a pulley I' and is also connected to the lower end of the shaft E, the chains H and I being wound in opposite directions around the pulleys $E^2$ upon the lower end of the shaft, so that when one chain is wound upon the said pulleys the other one will be unwound. The chains H and I are so arranged that when the chains C are wound around the spool D for the purpose of elevating the fender the chain H will be wound upon the pulleys $E^2$ upon the shaft E and elevate the forward end of the brake-block, and the chain I will be unwound, permitting the end to descend, as most clearly illustrated in Fig. 2, and when the chains H and I are so wound the brake-blocks F will be held elevated above the track-rails. When, however, the crank-handle E' is operated to release the chain C and drop the forward end of the fender, the chain I will be wound upon the pulley of the shaft E and the chain H will be unwound therefrom, and the brake-block will be forced into contact with the track-rails, thereby checking the motion of the car at the same time the fender is dropped.

Brackets J are arranged upon the lower side of the fender adjacent to its forward end and have a shaft K journaled therein, said shaft having wheels L mounted upon its ends, said wheels being adapted to contact with the rails when the fender is dropped. Pulley-wheels M are also mounted upon the shaft K, and cross-belts N are arranged upon the said pulleys M and journaled around the grooved portions of the roller B, so that when the fender is dropped the wheels L will contact with the track-rails and during the forward motion of the car will rotate the roller B, so as to prevent anything striking the said roller passing under the same, the rotary motion of said roller being such that it tends to throw any article upwardly upon the fender.

In order to prevent anything passing under the fender and contacting with the brake-blocks, I employ guard-rails O, which are pivotally connected at their forward ends to the shaft K and at their rear ends to the brake-blocks F, said rear ends being slotted longitudinally, as shown at O', to receive the pivot-pin $O^2$, which connects said guard-rails and brake-blocks.

It will thus be seen that I provide an exceedingly cheap, simple, and efficient construction of combined car-brake and fender and one in which the braking mechanism will be simultaneously operated by the dropping of the fender.

Having thus fully described my invention, what I claim as new, and desire to secure by Letters Patent of the United States, is—

1. In a car-fender, the combination with the fender proper hinged to the front of the car, of the chains for supporting the said fender, a roller arranged at the forward end of the fender, track-wheels arranged adjacent to the forward end of the fender and adapted to contact with the track-rails when the fender is lowered, and the pulleys and belts operated by said track-wheels for rotating the roller carried at the forward end of the fender, substantially as shown and described.

2. The combination with the fender and brake-blocks, of the chains for raising and lowering the said fender and brake-blocks, the track-wheels attached to the fender and the guard-rails connecting the fender and brake-blocks, substantially as set forth.

3. The combination with the hinged fender having a roller at its forward end, of the depending brackets attached to said fender, the shaft journaled in said brackets and carrying track-wheels and pulleys, cross-belts traveling around said pulleys and roller, the vertical rotary shaft, the chains connecting the said shaft and fender, the brake-blocks pivotally suspended beneath the car-platform, the chains connecting the opposite ends of said brake-blocks to the vertical shaft, and the guard-rails pivotally connected at their forward ends to the shaft arranged beneath the fender, their rear ends being slotted longitudinally and pivotally connected to the sides of the brake-blocks, substantially as and for the purpose described.

LINDORO DE INTINIS.

Witnesses:
BLANCHE E. HICKS,
G. ANACLERIO.